Sept. 2, 1930.    T. K. PETERS    1,774,842
BEACON LIGHT
Filed July 7, 1928
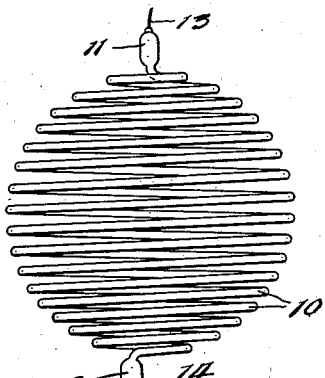
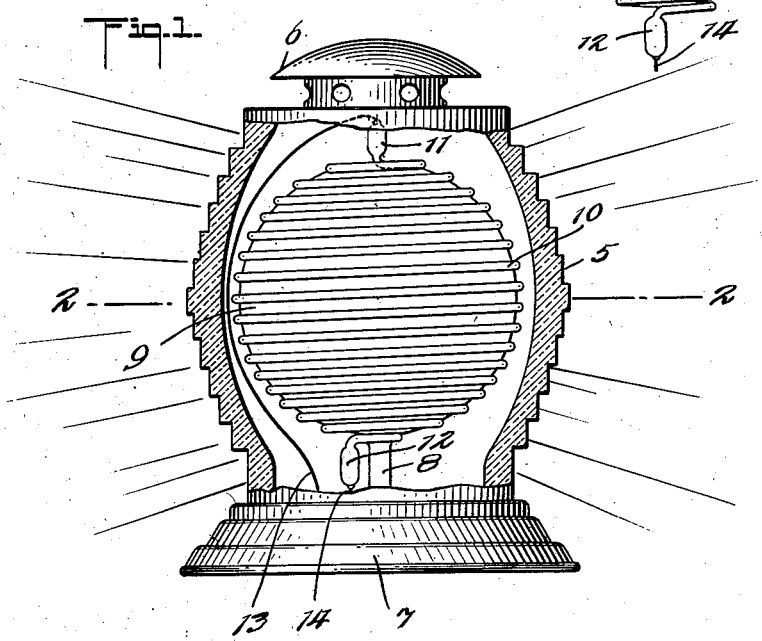
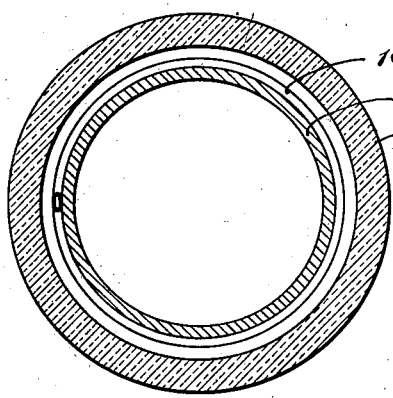
INVENTOR.
THOMAS K. PETERS
BY
ATTORNEY Patented Sept. 2, 1930

1,774,842

UNITED STATES PATENT OFFICE

THOMAS K. PETERS, OF NEW YORK, N. Y.

BEACON LIGHT

Application filed July 7, 1928. Serial No. 291,031.

This invention relates to improvements in beacon lights in which in contradistinction to sending out light from a luminescent tube in a single converging or diverging ray, the light is emitted in all directions.

In carrying out the invention I utilize a spherical reflector about the periphery of which a single length of luminescent tubing is spirally arranged in conjunction with a lens having double refraction.

In the drawings:

Figure 1 is a side elevation of the beacon constituting my invention, a portion thereof being broken away and shown in section to more clearly illustrate the structure.

Figure 2 is a transverse section taken along line 2—2 of Figure 1.

Figure 3 is a detailed elevation of the luminescent tubing removed from its housing.

Specifically, the invention comprises a housing 5 in the form of a Fresnel lighthouse lens of double refraction, suitably supported between the conventional top 6 and base 7. Rising from the base 7 is an upright 8 supporting a spherical-shaped member 9 of any suitable insulating material and possessing a highly reflective surface. Formed about the periphery of the member 9 in spiral fashion and manifestly describing the spherical contour of said member is a single length of luminescent tubing 10, clearly exhibited in Figure 3, and adapted to contain neon or similar gas. The opposite terminals of the tubing are provided with electrodes 11 and 12, and in turn, these electrodes are connected with any suitable source of electrical energy by the wires 13 and 14. It is apparent that a revolving shield, (not shown) similar to that employed in lighthouses, may be used to cut off a portion of the rays and direct a flash of light in any desired sector.

When the neon gas is energized in the tubing and the luminosity thus produced reflected by the sphere 9 through the double refractory housing 5, the rays will be sent out in all directions, and particularly because of the peculiar characteristics of the neon gas, especially its remarkable property of penetration, can be clearly observed at remote points even through a heavy fog.

What I claim is:

1. In an apparatus of the class described, a spherical reflector, luminescent tubing spirally arranged about the outer periphery of said reflector, electrodes carried by said tubing and a lens of double refraction enclosing said tubing.

2. An apparatus of the class described comprising a base, a substantially spherical reflector mounted on the base, luminescent tubing spirally arranged about the outer periphery of said reflector, electrodes carried by said tubing, and a double refraction lens enclosing said tubing and supported by said base.

Signed at New York city, New York, this 4th day of February, 1928.

THOMAS K. PETERS.